US008676191B2

(12) United States Patent
Soumier et al.

(10) Patent No.: US 8,676,191 B2
(45) Date of Patent: Mar. 18, 2014

(54) METHOD AND DEVICE FOR MANAGING COMMUNICATION CHANNELS FOR DATA EXCHANGE FROM AN AIRCRAFT

(75) Inventors: Vincent Soumier, Toulouse (FR); Eric Rabaute, Tournefeuille (FR); Christophe Regouby, Toulouse (FR); Yvan Mothes, Castelany Destretefonds (FR); Fabien Gilis, Toulouse (FR); Pierre Cuq, Ayguesvives (FR)

(73) Assignees: Airbus, Blagnac (FR); Airbus Operations S.A.S., Toulouse (FR)

( * ) Notice: Subject to any disclaimer, the term of this patent is extended or adjusted under 35 U.S.C. 154(b) by 480 days.

(21) Appl. No.: 12/594,273

(22) PCT Filed: Apr. 4, 2008

(86) PCT No.: PCT/FR2008/000477
§ 371 (c)(1),
(2), (4) Date: Mar. 17, 2010

(87) PCT Pub. No.: WO2008/139062
PCT Pub. Date: Nov. 20, 2008

(65) Prior Publication Data
US 2010/0167723 A1 Jul. 1, 2010

(30) Foreign Application Priority Data
Apr. 6, 2007 (FR) ....................................... 07 54394

(51) Int. Cl.
*H04W 4/00* (2009.01)
*H04B 7/185* (2006.01)

(52) U.S. Cl.
CPC .................................. *H04B 7/18506* (2013.01)

USPC .............. 455/431; 455/98; 455/450; 370/329

(58) Field of Classification Search
USPC .............................. 455/431, 98, 450; 370/329
See application file for complete search history.

(56) References Cited

U.S. PATENT DOCUMENTS

| 6,353,779 B1 | 3/2002 | Simon et al. |
| 8,045,977 B2 * | 10/2011 | McGuffin ..................... 455/431 |
| 8,316,225 B2 * | 11/2012 | Yukawa et al. ............... 713/150 |
| 2002/0009993 A1 | 1/2002 | Dastrup et al. |
| 2002/0155833 A1 | 10/2002 | Borel |

(Continued)

FOREIGN PATENT DOCUMENTS

| FR | 2 787 658 | 6/2000 |
| WO | 02 30007 | 4/2002 |
| WO | 03 021815 | 3/2003 |

*Primary Examiner* — Steven Kelley
(74) *Attorney, Agent, or Firm* — Oblon, Spivak, McClelland, Maier & Neustadt, L.L.P.

(57) ABSTRACT

A method and device for managing communication channels for data exchange from an aircraft establishes at least one connection path between the aircraft and at least one ground entity with a plurality of communication channels of at least two different types. After detecting an event such as modification of a communication channel condition or a modification of aircraft position, a communication configuration enabling the aircraft to receive or transmit data from or to the ground entity via at least one of the communication channels is determined. A mechanism for establishing at least one connection path is then adapted based on the communication configuration. Advantageously, the transmission of at least one datum includes determining a priority level of the datum and determining the type of communication channel of the connection path, the datum being transmitted if the determined type of communication channel is compatible with the priority level.

12 Claims, 8 Drawing Sheets

(56) References Cited

U.S. PATENT DOCUMENTS

| | | |
|---|---|---|
| 2003/0045231 A1 | 3/2003 | de La Chapelle et al. |
| 2003/0098773 A1* | 5/2003 | Chakravarty et al. .......... 340/3.1 |
| 2003/0235196 A1* | 12/2003 | Balachandran et al. ...... 370/392 |
| 2005/0070222 A1 | 3/2005 | de La Chapelle et al. |
| 2006/0276127 A1* | 12/2006 | Cruz et al. ................... 455/12.1 |
| 2007/0021117 A1* | 1/2007 | McKenna et al. ............. 455/431 |

* cited by examiner

METHOD AND DEVICE FOR MANAGING COMMUNICATION CHANNELS FOR DATA EXCHANGE FROM AN AIRCRAFT

BACKGROUND OF THE INVENTION

1. Field of the Invention

The present invention relates to the field of avionics communications and more particularly to a method and device for managing communication channels for data exchanges from an aircraft, capable in particular of permitting asynchronous exchanges of digital messages between the information system of an airplane and that of the airline company on the ground with the aid of several communications means.

2. Discussion of the Background

The needs for information exchange between an airplane and the ground are increasing with the development of airplanes. These needs are related in particular to updates of the different components of the airplane information system, to the transmission of flight information items from the ground stations, to the transmission of maintenance information items from the airplane to optimize the costs, and to the services offered to the passengers.

It is appropriate to distinguish the exchanges of information between the airplane and the ground and the exchanges of information between several systems of the airplane, related to the airplane or to the passengers. The systems present in the airplane are able to communicate with one another by standard communication means, such as by hard-wired networks or by wireless networks, especially WiFi (Wireless Fidelity) networks of 802.11a/b/g type.

The links between an airplane and the ground are generally specific to the airplanes. For example, the ATN communication system (Aeronautical Telecommunication Network) AGARS (ARINC Communication Addressing and Reporting System) makes it possible to exchange coded data between the airplane and the ground via VDL (VHF Digital Link), Mode S or satellite links.

The costs of specific links between an airplane and the ground are generally higher than those of "open world" communication systems, such as WiFi, WiMax (Worldwide Interoperability for Microwave Access), GSM (Global System for Mobile Communications), GPRS (General Packet Radio Service), UMTS (Universal Mobile Telecommunications System), MPDS (Mobile Packet Data Service) or SBB (Swift Broad Band). In addition, these open world communication systems often offer performances superior to those encountered in the avionics world, and they are undergoing a rapid technological evolution. However, they may reach maturity and/or become obsolete in less than ten years, potentially representing a serious handicap in the aeronautical field, where development and standardization time is long.

SUMMARY OF THE INVENTION

A major disadvantage of solutions used for communications between airplanes and the ground is that they are incapable of satisfying the double need of furnishing a single air-to-ground system for communication with all of the applications installed on board the airplane, taking into account in particular the management of priorities and costs, and of permitting the addition of new technologies such as HSDPA (High Speed Downlink Packet Access) without impacting the existing communication system, so as to accelerate the time for integration of these technologies.

The invention makes it possible to resolve at least one of the problems described in the foregoing.

The object of the invention is therefore a method for communication of data in an aircraft comprising means capable of establishing at least one connection path between the said aircraft and at least one entity on the ground according to a plurality of communication channels of at least two different types, this method being characterized in that it comprises the following steps, detecting an event;

determining a communication configuration according to the said event in order to permit the said aircraft to receive or transmit data to the said at least one entity on the ground by way of at least one of the said communication channels; and adapting the said means capable of establishing at least one connection path in order to establish at least one connection path between the said aircraft and the said at least one entity on the ground according to the said communication configuration.

The method according to the invention therefore makes it possible to employ new media or new applications without substantial modification of the communication system. It also makes it possible to adapt easily to future evolutions of communications media, especially to evolutions of media in terms of communication security.

According to a particular embodiment, the method additionally comprises a step of transmitting at least one datum, the said transmission step comprising the following steps, determining a priority level of the said at least one datum;

determining the type of communication channel of the said at least one connection path; and if the said type of determined communication channel is compatible with the said priority level, transmitting the said at least one datum to the said at least one entity on the ground.

The method according to the invention therefore permits adapted management of the messages to be transmitted.

Advantageously, to simplify the implementation of the method, a destination address of the said at least one entity on the ground is associated with each priority level, the said at least one datum being transmitted to the destination address associated with the priority level of the said at least one datum.

According to a particular embodiment, the determination of the said compatibility of the said determined communication channel with the said priority level is a function of is determined by at least one configuration parameter. This embodiment offers an easy configuration of the modes of transmission of messages.

According to another particular embodiment, the said event is related to the state of the said communication channels or to the position of the said aircraft.

According to another particular embodiment, the method additionally comprises a step of accessing at least one datum to be transmitted, the format of the said at least one accessed datum being independent of the communication channel of the said at least one connection path. In this way the applications using the communication method are independent of the media used.

Another object of the invention is a computer program comprising instructions capable of employing each of the steps of the method described in the foregoing.

Another object of the invention is a device for communication of data in an aircraft comprising means capable of establishing at least one connection path between the said aircraft and at least one entity on the ground according to a plurality of communication channels of at least two different types, this device being characterized in that it comprises the following means, means for detecting an event;

means for determining a communication configuration according to the said event permitting the said aircraft to receive or transmit data to the said at least one entity on the ground by way of at least one of the said communication channels; and means for adapting the said means capable of establishing at least one connection path in order to establish at least one connection path between the said aircraft and the said at least one entity on the ground according to the said communication configuration.

The device according to the invention therefore makes it possible to employ new media or new applications without substantial modification of the communication system. It also makes it possible to adapt easily to future evolutions of communications media, especially to evolutions of media in terms of communication security.

According to a particular embodiment, the device additionally comprises means for transmitting at least one datum, the said transmission means comprising the following means, means for determining a priority level of the said at least one datum;

means for determining the type of communication channel of the said at least one connection path; and means for determining if the said type of determined communication channel is compatible with the said priority level and for transmitting the said at least one datum to the said at least one entity on the ground.

Advantageously, the device additionally comprises means for storing the data to be transmitted in memory, the said data to be transmitted being stored in memory according to priority levels associated with the said data to be transmitted, a destination address of the said at least one entity on the ground being associated with each priority level.

According to another particular embodiment, the said means for detecting an event are capable of detecting a modification of the state of the said communication channels or the position of the said aircraft, in order to determine the preferred communication channel.

BRIEF DESCRIPTION OF THE DRAWINGS

Other advantages, objectives and characteristics of the present invention become apparent from the detailed description hereinafter, provided by way of non-limitative example, with reference to the attached drawings, wherein.

DESCRIPTION OF THE PREFERRED EMBODIMENTS

The object of the invention is a communication method and device capable of managing in native manner the asynchronous exchange of data, preferably in the form of digital messages, between a mobile entity such as an airplane and the ground, according to several communication channels as a function of their availabilities and the policy adopted by the airline company. In particular, such a policy may be established as a function of the geographic zone, of the phase of flight and of the priority of the messages to be transmitted. The messages are transmitted, for example, in the form of IP (Internet Protocol) packets.

Figure 1:
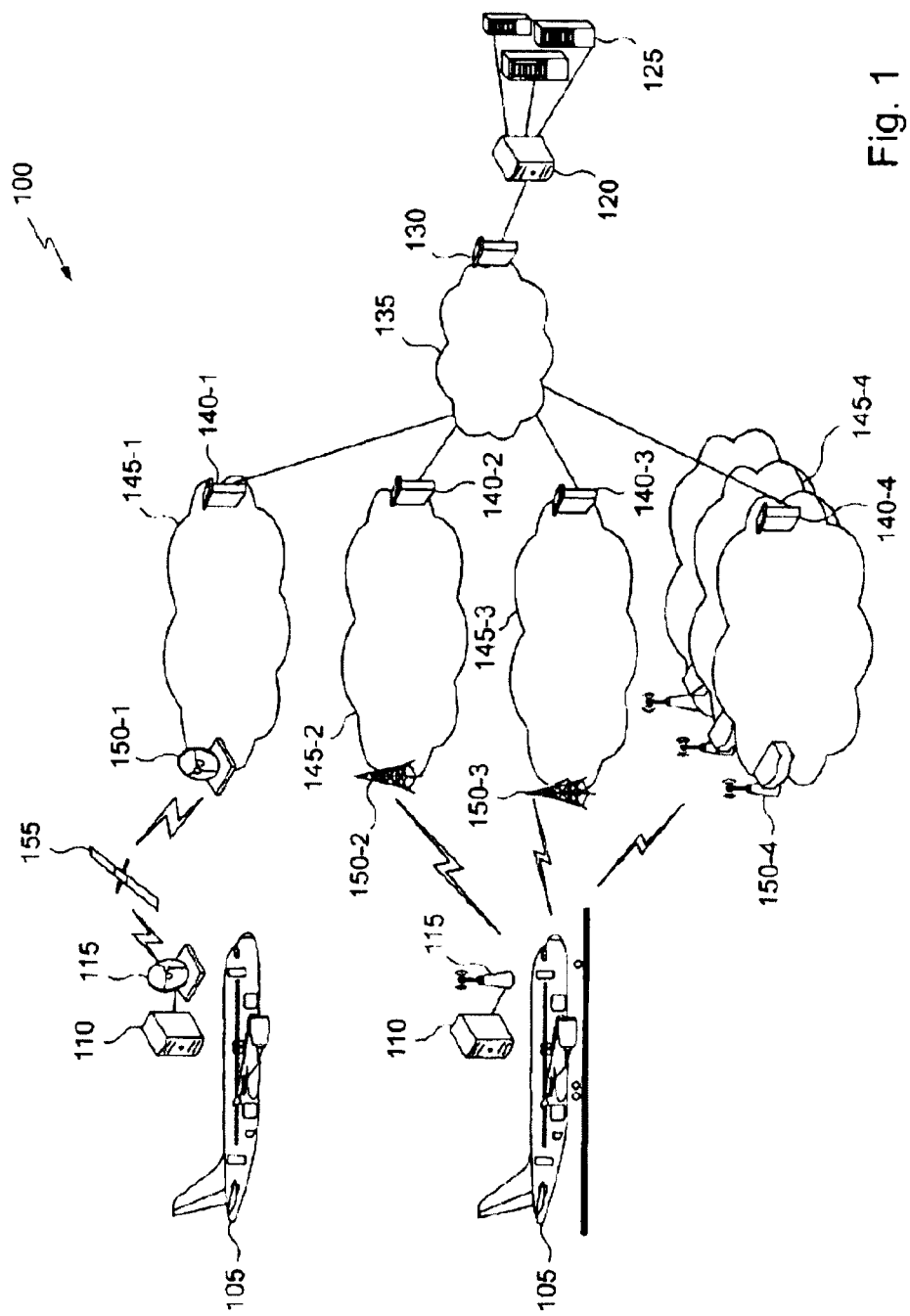
FIG. 1 illustrates an example of the environment in which the invention is implemented to permit data exchange between an airplane and the ground.

FIG. 1 illustrates an example of the environment 100 in which the invention is implemented to permit data exchange between an airplane 105 and the ground, when the airplane is on the ground or in proximity to the ground, and when the airplane is in the air.

Airplane 105 preferably comprises an application server (not represented), a communication server 110 and a wireless communication interface 115 capable of transmitting and receiving data according to several communication channels. The communication channels illustrated here are related to satellite communications, to WiMax communications, to communications according to mobile telephony technologies such as GSM, GPRS and UMTS, and to WiFi communications.

On the ground, a communication server 120 connected to application servers 125 is connected to a network 135 such as the Internet, preferably via a protective device 130 (firewall). Network 135 is itself connected to a plurality of wireless communication networks such as satellite network 145-1, WiMax network 145-2, network 145-3 of GSM, GPRS or UMTS type and network 145-4, preferably via protective devices 140-1 to 140-4 respectively. Each of the wireless communication networks 145-1 to 145-4 comprises at least one wireless communication interface referenced 150-1 to 150-4 respectively, making it possible to transmit and receive data according to the associated protocol. Thus satellite network 145-1 is capable of receiving data from satellite 155 and transmitting data from satellite 155, satellite 155 itself being capable of transmitting data to or from wireless communication interface 115 of airplane 105. Similarly, WiMax network 145-2 is capable of receiving or transmitting data from or to wireless communication interface 115 of airplane 105. The same is true for networks 145-3 and 145-4. Although FIG. 1 shows only a single general wireless communication interface, wireless communication interface 115 is preferably composed of several wireless communication interfaces, one per communication channel or in other words in the present case an interface for communications via satellites, an interface of WiMax type, an interface of GSM, GPRS or UMTS type and an interface of WiFi type.

When the airplane is on the ground or in proximity to the ground, wireless communication interface 115 of the airplane is capable of communicating with wireless communication interfaces 150-1 and with wireless communication interfaces 150-2 to 150-4 (it is assumed here that the ground environment of the airplane is provided with these wireless communication interfaces). When the airplane is in the air, at a distance from wireless communication interfaces 150-2 to 150-3 greater than the communication range of these interfaces, only wireless communication interface 150-1 of the satellite network may be used.

Figure 2:
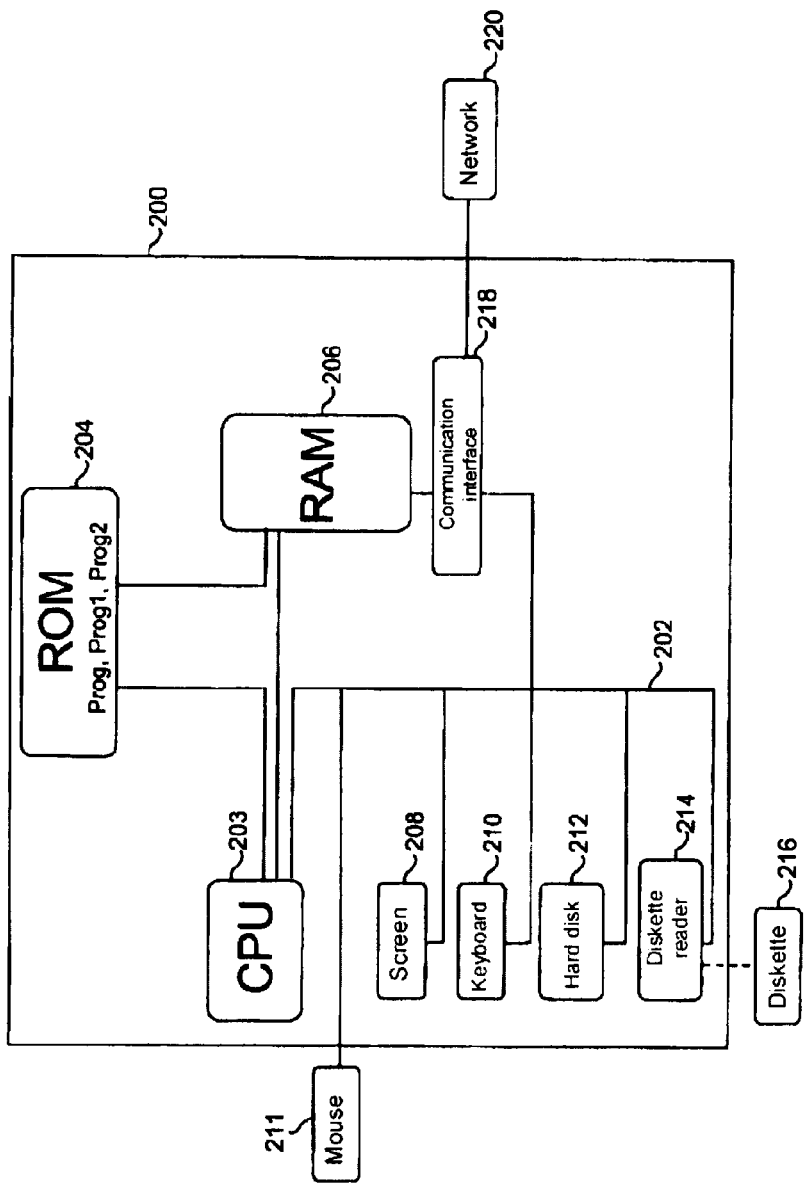
FIG. 2 represents an example of an apparatus capable of implementing part of the invention.

FIG. 2 illustrates an example of an apparatus capable of implementing part of the invention. Apparatus 200 is, for example, a communication server or an application server.

Apparatus 200 is provided with a communication bus 202, to which there are connected:
- a central processing unit or microprocessor 203 (CPU, Central Processing Unit);
- a read-only memory 204 (ROM, Read Only Memory), which may be provided with the programs "Prog", "Prog1" and "Prog2";
- a random access memory or cache memory 206 (RAM, Random Access Memory), provided with registers capable of recording the variables and parameters created and modified during execution of the aforesaid programs; and
- a communication interface 218 connected to a distributed communication network 220 such as the Internet, the interface being capable of transmitting and receiving data.

Optionally, apparatus 200 may be provided with:
- a screen 208 for viewing data and/or for functioning as a graphical interface with the user who will be able to interact with the programs according to the invention, with the aid of a keyboard 210 or of any other means, such as a pointing device, for example a mouse 211 or a light pen, a touch screen or a remote control;
- a hard disk 212, which may be provided with the aforesaid the programs "Prog", "Prog1" and "Prog2" and with data processed or to be processed according to the invention;
- a diskette reader 214 capable of receiving a diskette 216 and therein reading or writing data processed or to be processed according to the invention; and,
- a reader for memory cards, capable of therein reading or writing data processed or to be processed according to the invention.

The communication bus permits communication and interoperability among the different elements included in apparatus 200 or connected thereto. The depiction of the bus is not limitative and, in particular, the central unit is capable of communicating instructions to any element of apparatus 200 directly or by way of another element of apparatus 200.

The executable code of each program permitting the programmable apparatus to employ the method according to the invention may be stored, for example, on hard disk 212 or in read-only memory 204.

According to one variant, diskette 216 may contain data as well as the aforesaid executable code of programs, which, once read by apparatus 200, will be stored on hard disk 212.

In a second variant, the executable code of the programs may be received by way of communication network 220, via interface 218, to be stored in a manner identical to that described in the foregoing.

The diskettes may be replaced by any information medium such as, for example, a compact disk (CD ROM) or a memory card. In general, the diskettes may be replaced by information storage means that can be read by a computer or by a microprocessor, that may or may not be integrated in the apparatus, that may be removable, and that are capable of storing in memory one or more programs whose execution permits implementation of the method according to the invention.

More generally, it will be possible to load the program or programs into one of the storage means of apparatus 200 before they are executed.

Central unit 203 will command and direct the execution of instructions or portions of software code of the program or programs according to the invention, such instructions being stored on hard disk 212, in read-only memory 204 or in the other aforesaid storage elements. During boot-up, the program or programs stored in a non-volatile memory, such as hard disk 212 or read-only memory 204, are transferred to random-access memory 206, which then contains the executable code of the program or programs according to the invention as well as registers for storing in memory the variables and parameters necessary for implementation of the invention.

It should be noted that the communication apparatus containing the device according to the invention may also be a programmed apparatus. This apparatus then contains the code of the networking program or programs, for example fixed in an application-specific integrated circuit (ASIC).

Figure 3:
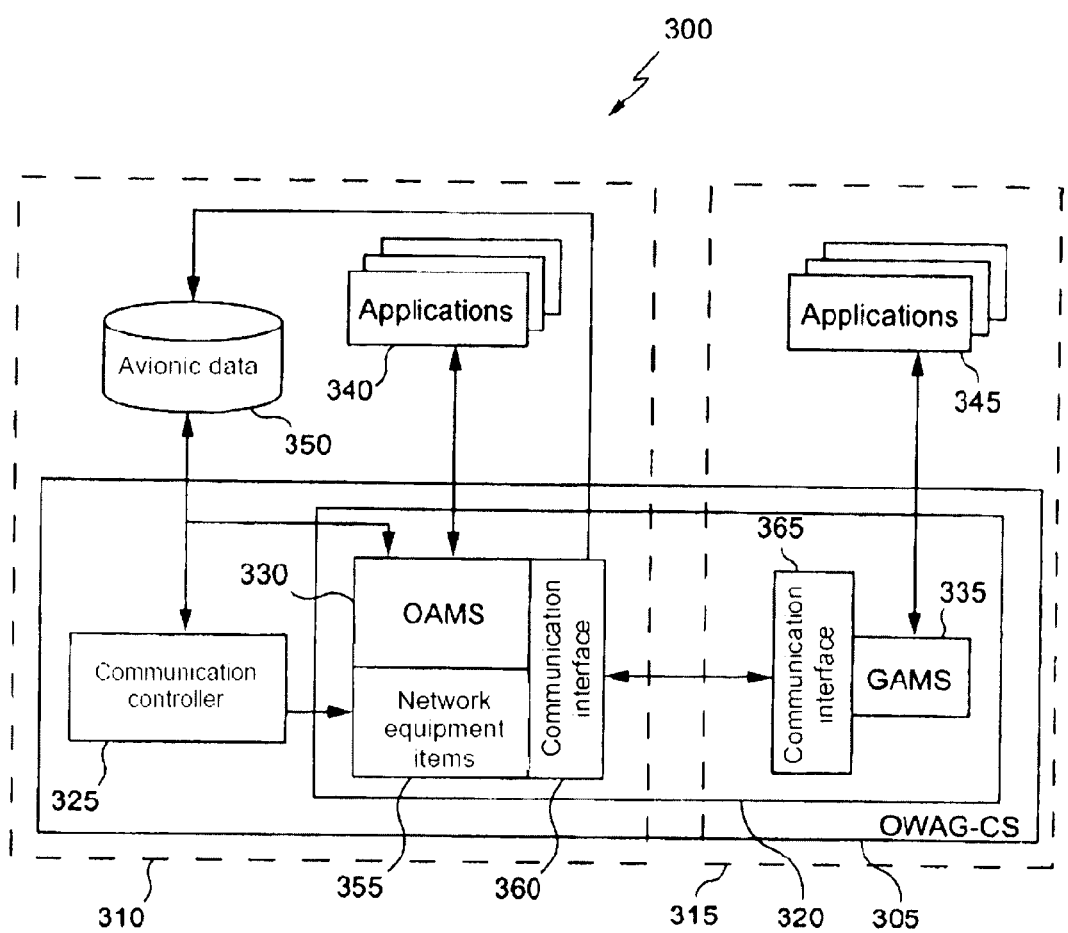
FIG. 3 illustrates the communication system according to the invention.

FIG. 3 illustrates communication system 300 according to the invention, known as OWAG-CS (Open World Aircraft Ground-Communication System), which comprises a core 305, one component of which is implemented in airplane communication system 310 and another component of which is implemented in ground communication system 315. OWAG-CS communication system 300 is preferably composed of two distinct parts. A first part 320 is related to data exchange between the airplane and the ground. A second part 325, known as "Communication Controller", is related to management of communication channels. The first part itself comprises two modules, a first module 330, known as OAMS (On-board Asynchronous Messaging Service), implemented in the airplane, and a second module 335, known as GAMS (Ground Asynchronous Messaging Service), implemented on the ground. Each of the modules, OAMS 330 and GAMS 335, is used as interface for application elements 340 and 345 respectively.

Communication controller 325 and OAMS module 330 are connected to a device 350 comprising avionic data, such as a memory or a database, whose information items are obtained from transducers or originate from flight computers. These avionic data are used in particular to determine which communication channels may be used. The communication controller controls in particular network equipment items 355 of the airplane. The network equipment items make it possible to establish a connection between the airplane and the ground.

Data exchange between the OAMS and GAMS modules is achieved via communication interfaces 360 and 365, capable of employing several types of communication channels. The configuration of communication channels of communication interface 360 is controlled by communication controller 325.

The information flow established between communication controller 325 and network equipment items 355 is a configuration flow, which comprises the commands transmitted by the communication controller to the network equipment items in order to update the configuration thereof.

The information flow established between communication interface 360 and device 350, between device 350 and communication controller 325 and between a configuration file related to the policy of the airline company and communication controller 325 is a supervision flow, which comprises information items about updating avionic data via communication interface 360 and via communication controller 325.

Finally, the data flow established between communication interface 360, network equipment items 355 and OAMS module 330 comprises the data exchanged between OAMS module 330 and GAMS module 335 along the different available connection paths.

This distribution of communication system 300 provides in particular that the application elements in charge of data transmission are not impacted by the addition, removal or modification of types of communication channels. All of the problems of network configuration are therefore dissociated from the message delivery application layer. This is also true for the airline company's infrastructures, for which the routes between the airplane and the ground will be transparent. In this way it is possible to develop functionalities without fear that these functionalities will have to be modified upon each addition, removal or modification of the type of communication channel. The application interface between application elements 340 and OAMS module 330 is advantageously standardized to mask the problems of data exchange for the developers of on-board applications and thus to decorrelate the versions of applications implemented in the airplane from OAMS module 330.

According to a first embodiment, communication controller 325 is an application service installed on a server on board the airplane, comprising dedicated connectors interfaced with an avionic database indicating in particular the phase of flight of the airplane and with configuration files defining the policy of the airline company in the matter of communication, such as the moment at which the satellite may be used. These two types of information item permit communication controller 325 to calculate, in real time, the configuration of network equipment items necessary for establishment of end-to-end links between OAMS module 330 implemented in the airplane and GAMS module 335 implemented on the ground. Communication controller 325 preferably operates only at the low layers of the OSI module and establishes, in real time, the connection paths as a function of the availability of communication channels, of the phases of flight and of the policy of the airline company. This adaptability in establishment of connection paths makes it possible to optimize the communications of the airplane as a function in particular of the priority of messages and of the cost of use of each communication channel.

It should be noted here that a GAMS module 335 centralizes the communications of a fleet of airplanes, or in other words the communications established with several OAMS modules 330, or several hundred OAMS modules 330 (one per airplane), for example, thus permitting an airline company to manage the exchanges of messages with its airplanes in centralized and therefore simplified manner.

Although OAMS module 330 and GAMS module 335 exhibit certain similarities, they differ in several points. Firstly, according to a particular embodiment, data storage is achieved within a database for GAMS module 335, whereas it is achieved directly in the file manager of the server for the OAMS module. In addition, since the airplane is always the initiator of communications, the servlets of the OAMS module are in charge of sending or sending back the data from or to the airplane, while the servlets of the GAMS module must receive or provide messages from or to the airplane. The exchange of messages is bidirectional, even though it is the communication system implemented in the airplane that is always the initiator of this exchange. Thus the OAMS module behaves as a client while the GAMS module behaves as a server.

The communication system according to the invention can therefore be analyzed according to three layers,
a network layer controlled by the communication controller;

a data layer employed by the OAMS and GAMS modules; and an application layer based on the APIs of the OAMS and GAMS modules.

Each of these three layers is described in more detail here.

As mentioned in the foregoing, the network layer is controlled by the communication controller, which is in charge of establishing the connection paths necessary for the communication of the two modules, OAMS and GAMS. The communication controller comprises a routing engine that uses avionic data obtained from a database, for example, in order to control network equipment items. The routing engine of the communication controller can be likened to a simple state machine.

The transition between a "waiting" state and a "routing" state is advantageously triggered by one or more avionic events derived from the modification of one or more parameters capable of representing the state of a communication channel or a simple flight information item. The state of a communication channel comprises, for example, its availability. A flight information item is, for example, the geographic position of the airplane relative to the ground, if necessary compared with a threshold to determine a "ground" position and an "in the air" position.

When the communication controller is in the "routing" state, it determines the configuration of network equipment items in order to take possible changes into account. For example, if the WiFi communication channel is available, and the phase of flight so permits (for example, if the airplane is on the ground) and the policy of the airline company so requires (route of defined priority), the communication controller configures the network equipment items so as to establish a WiFi connection path. The controller then indicates the establishment of this connection path in the avionic database. Configuration of network equipment items can be achieved by the creation and transmission of configuration scripts, the scripts being created by the communication controller and transmitted to the network equipment items.

When all of the network equipment items have been configured, and network parameters or flight parameters have not been modified, the communication controller goes into a "waiting" state, in which it monitors the modifications of network parameters and flight parameters.

Figure 4:
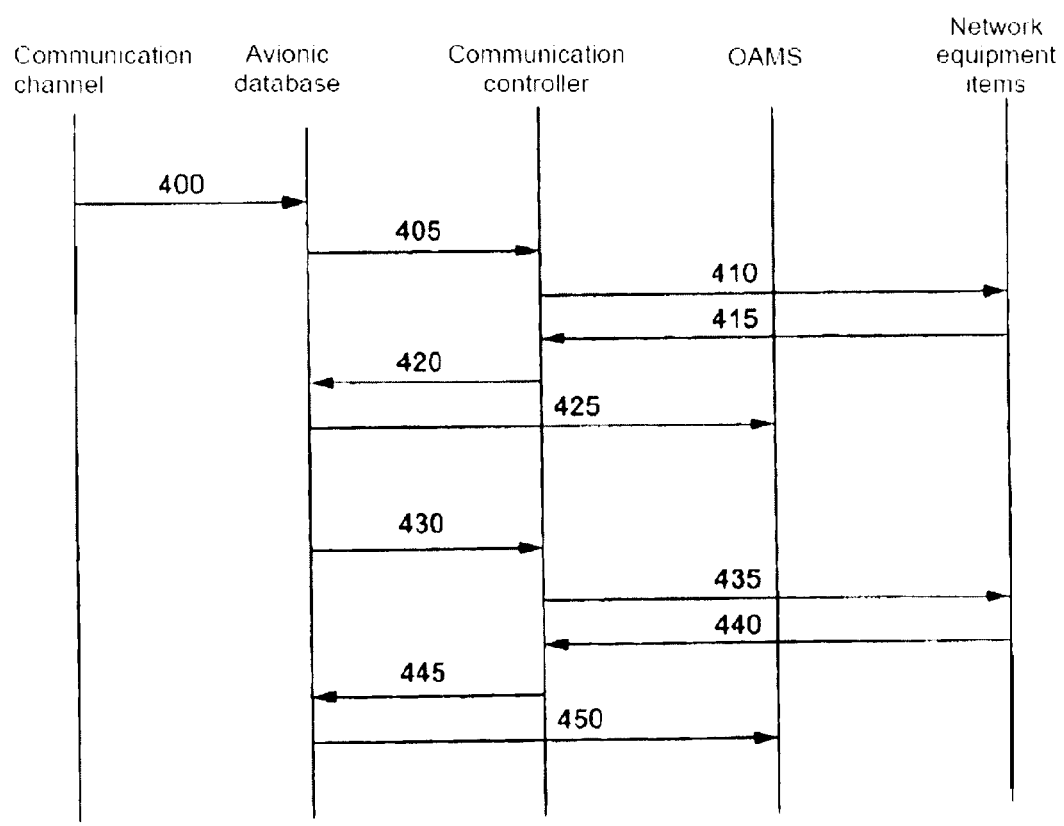
FIG. 4 shows an example of management of communication channels by a communication controller when a communication channel becomes available and when a flight parameter is modified.

FIG. 4 represents an example of management of communication channels by the communication controller when a communication channel becomes available and when a flight parameter is modified.

When a communication channel is available, or in other words when the communication interface has detected the possibility of emitting and receiving data from this communication channel, the communication interface transmits this information to the avionic database (step 400). Detection of the possibility of emitting and receiving data from a communication channel is related to the nature of the detection channel. This detection is achieved according to the standard protocol used for the communication channel in question. When the communication controller identifies the modification of the network parameter in the avionic database (step 406), the modification of the network parameter being related to the availability of the communication channel, the communication controller determines a new configuration for the network equipment items according to the flight parameters, to the available communication channels and to the policy of the airline company, and it transmits this new configuration to the network equipment items (step 410). The network equipment items modify their configuration and preferably transmit an acknowledgment of receipt to the communication controller (step 415). The communication controller then transmits the information to the effect that the new communication channel is available to the avionic database (step 420). When the OAMS module detects the modification of the avionic database to the effect that a new communication channel is available (step 425), the OAMS module can use this communication channel.

In a preferred embodiment, the modifications of the avionic database are detected by the communication controller and by the OAMS module. However, it must be considered here that a monitoring module may be associated with the avionic database to inform the communication controller and/or the OAMS module of any change.

When the modification of a flight parameter such as the position of the airplane is identified by the communication controller (step 430), the communication controller determines a new configuration for the network equipment items according to the flight parameters, to the available communication channels and to the policy of the airline company, and it transmits this new configuration to the network equipment items (step 435). The network equipment items modify their configuration and preferably transmit an acknowledgment of receipt to the communication controller (step 440). The communication controller then transmits the information to the effect that a new communication channel is available, that a communication channel is no longer available or that the parameters of a communication channel have been modified in the avionic database (step 445). When the OAMS module detects this modification in the avionic database (step 450), the OAMS module modifies its parameters so as to take these modifications into account.

The data layer used for data exchange is employed by the OAMS and GAMS modules in charge of controlling data exchange between an airplane and the ground. The data layer, situated between the network and application layers, uses the connection paths configured by the communication controller. The control of data transfer is therefore independent of the control of the communication channels.

The OAMS module and the GAMS module are implemented, for example, within J2EE application servers (Java 2 Enterprise Edition) in the form of Java servlet (Java is a trademark). The OAMS module may be of the traditional type of client-server architecture, where the API (Application Programming Interface) of the OAMS module is the client and the OAMS module is the server. Similarly, the GAMS module may be composed of an API of the GAMS module, of the GAMS module and of a database. The applications, coded in Java and in C++, for example, may be interfaced with these two servers by means of two APIs, one for the OAMS module and one for the GAMS module. These are able to communicate with the servers within an http flow (HyperText Transfer Protocol).

The message exchanges of BtoB type (Business-to-Business) between the OAMS module and the GAMS module may be encapsulated in an HTTPS flow at the initiative of the aircraft, preferably using X509 certificates for authentication, in order to satisfy the requirements of security of communications between airplanes and the ground.

Figure 5:
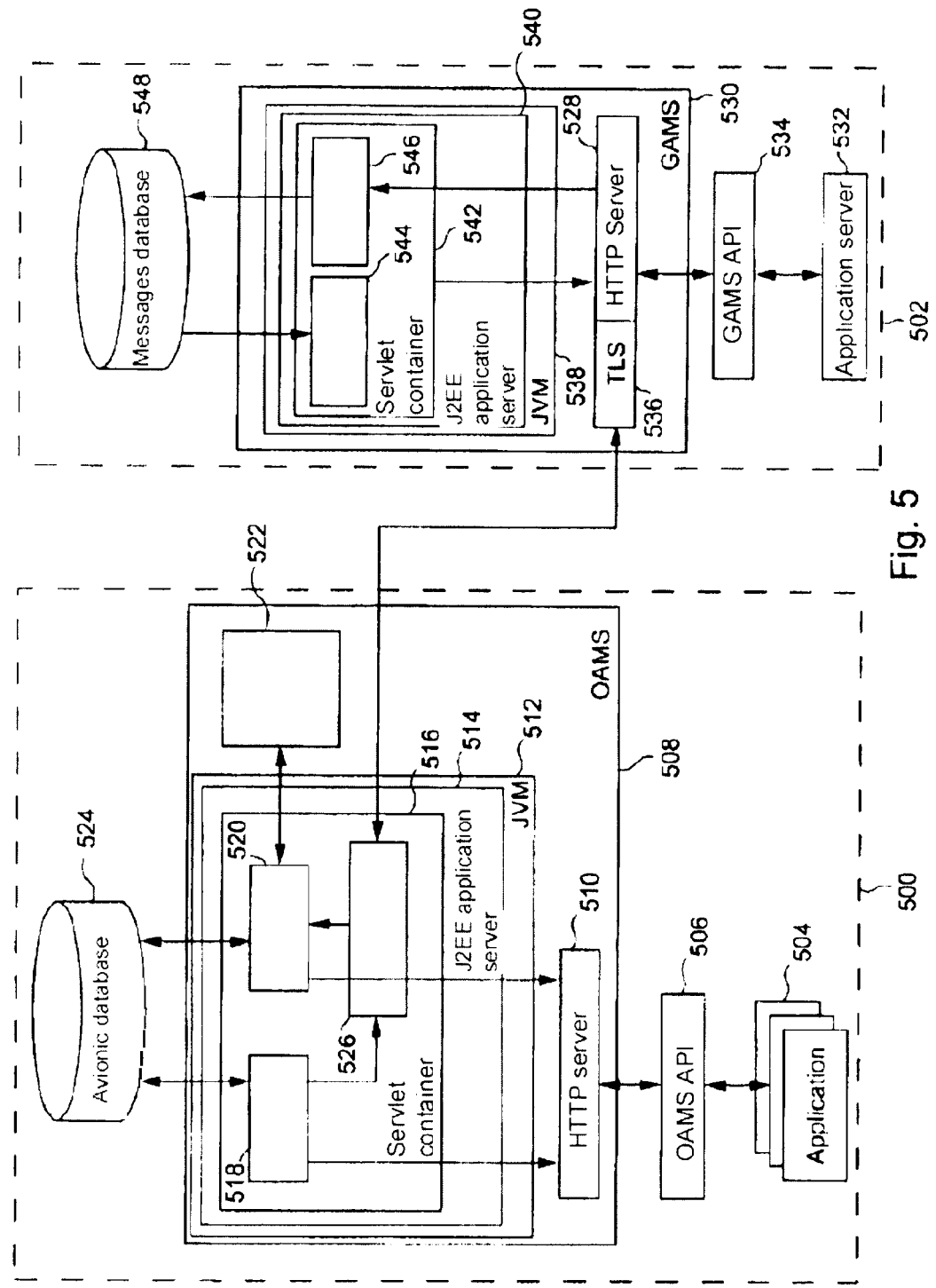
FIG. 5 illustrates a first example of implementation for the exchange of messages between the information system of an aircraft and an information system on the ground.

FIG. 5 illustrates such an example of implementation for the exchange of messages between airplane information system 500 and ground information system 502. Applications 504 of airplane information system 500 use OAMS APIs 506 to transmit requests to OAMS module 508 and more precisely to a front-end http server 510 of OAMS module 508. The results of the requests are transmitted to applications 504 by the http server via OAMS APIs 506.

The requests for applications 504 received by http server 510 are transmitted to the application server, in this case J2EE application server 514 (Java 2 Enterprise Edition) of Java virtual machine 512 (JVM, Java Virtual Machine). The results of the requests are transmitted to http server 510 by application server 514.

Advantageously, application server 514 comprises a Java servlet container 516 for processing the requests for applications by means of two dedicated services 518 and 520, of the "send" and "fetch" type respectively. The "send" service assures transmission of messages to the GAMS module, while the "fetch" service is in charge of recovering the messages waiting on the same server in memory 522.

To assure these tasks, these two services are interfaced with avionic database 524 in order to verify the availability of communication channels, with http server 510 in order to communicate with the applications, and with the implementation of an https client 526 to communicate securely with the ground information system. It should be noted that the OAMS module additionally comprises an interface with a file manager of the server for storage, in memory 522, of messages waiting to be sent to the ground information system or to be recovered by applications 504. Within memory 522, the messages are preferably organized into dedicated message boxes for each application.

Similarly, a front-end http server 528 of GAMS module 530 receives requests for applications 532 from ground information system 502 via GAMS APIs 534. Front-end http server 528 of GAMS module 530 also receives the requests for applications 504 from OAMS modules 508 of airplane information systems 500 via tunnels 536 of TLS type (Transport Layer Security). The responses to the requests for applications are transmitted by http server 528 to application server 532 via GAMS APIs 534 and to applications 504 via tunnels 536.

The requests for applications are transmitted by http server 528 to the services of servlet container 542 of J2EE application server 540 of Java virtual machine 538. The results of the requests are transmitted to http server 528 by application server 540.

Just as the OAMS module, the GAMS module advantageously comprises two dedicated services 544 and 546, known as "message provider" and "receive" respectively. "Message provider" service 544 makes the messages available to the OAMS modules in question, while "receive" service 546 receives the messages from http server 528 and distributes them in the message boxes of a memory or of a database 548. Thus the two services 544 and 546 are interfaced with database 548 in order to store the messages in dedicated message boxes, which are preferably organized in the same way as in the OAMS modules, or in other words dedicated to each application, with the sole exception that the GAMS module must manage several airplanes and therefore must group the message boxes for each aircraft and for each priority.

OAMS API 506 and GAMS API 534 serve to mask the problems of communication with the applications of the airplane and ground information systems. These APIs therefore form a facade whereby all the functionalities of the OWAG-CS communication system can be used. These APIs, which can be coded in Java and in C++ in order to be integrated in already existing applications, are based on the data layer formed by the OAMS and GAMS modules, and they communicate natively in http with the front-end http servers of the OAMS and GAMS modules.

Figure 6:
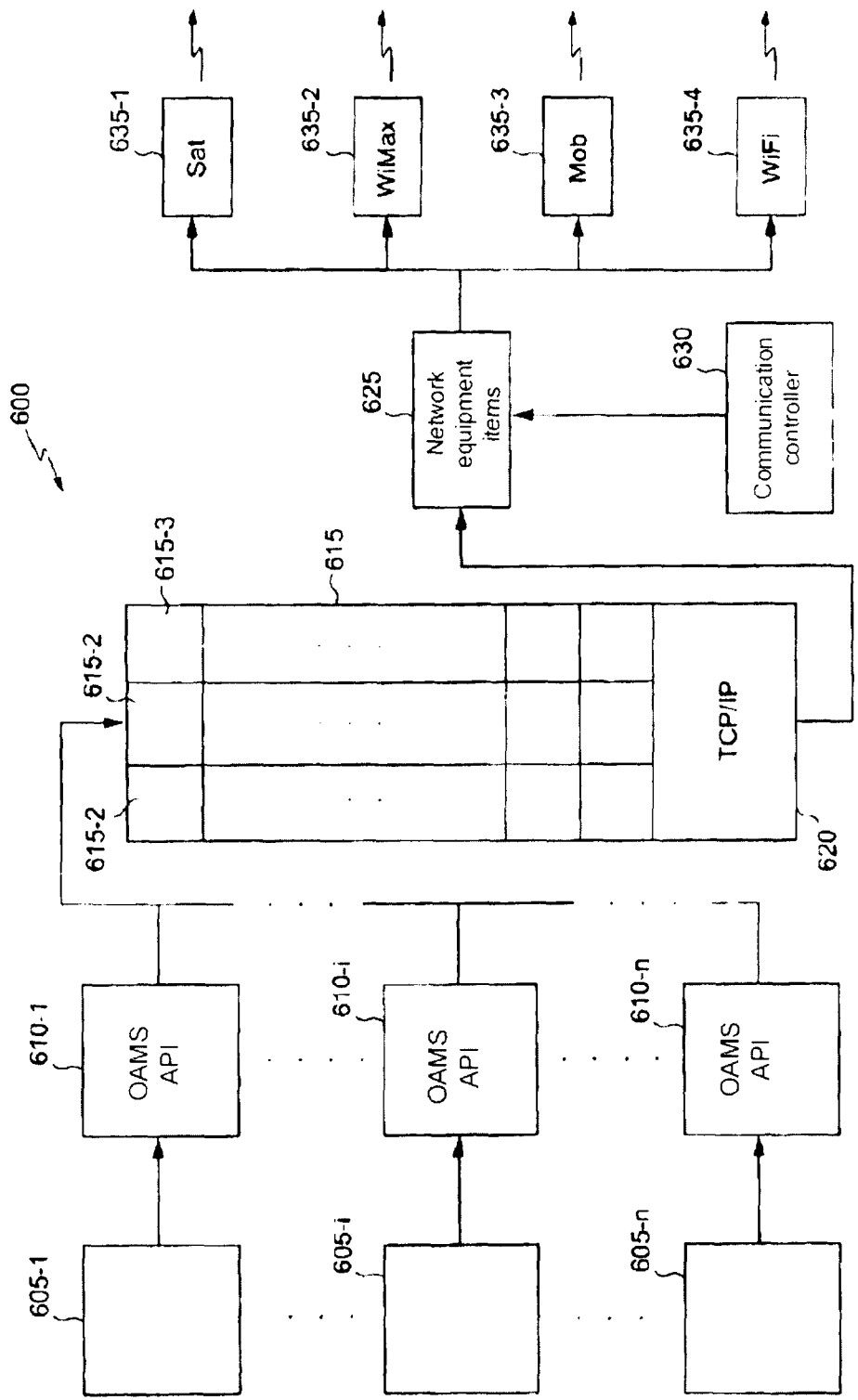
FIG. 6 shows a mechanism for management of priorities for messages transmitted by airplanes.

The message layer offers the applications of the airplane information systems and of the ground information system an advanced mechanism for managing priorities for the exchange of messages between the airplanes and the ground. FIG. 6 illustrates this mechanism 600 for managing priorities for the messages transmitted by airplanes.

The applications of the airplane information system, referenced 605-1 to 605-n, can transmit messages to the OAMS module via OAMS APIs referenced 610-1 to 610-n respectively. The OAMS module preferably comprises a memory 615 composed of memory elements of FIFO type (First In, First Out) 615-1, 615-2 and 615-3, capable of receiving the messages emitted by applications 605-1 to 605-n. The messages stored in memory 615 are transmitted to a TCP/IP stack (Transmission Control Protocol/Internet Protocol) 620, which breaks the message down into IP packets, in which the IP address is determined according to the priority of the message. An information item about the service quality associated with the priority level, of DSCP type (Differentiated Services Code Point), is then added to these IP packets, which are then transmitted to the communication interface via network equipment items 625 controlled by communication controller 630. The communication interface is composed of several elements, especially of a satellite communication interface element 635-1, of a WiMax communication interface element 635-2, of a communication interface element 635-3 in conformity with at least certain mobile telephone technologies such as GSM, GPRS and UMTS, and of a WiFi communication interface element 635-4.

Each memory element 615-1, 615-2 and 615-3 corresponds to a priority level. In the present case, three priority levels are used: low, medium and high. When an application 605-i sends a message, it associates a priority level therewith. Upon reception of a message, the OAMS module analyzes the priority level and stores the message in the memory element of FIFO type corresponding to the priority level of the message. For example, if a message of low priority is received, it is stored in memory element 615-3, if a message of medium priority is received, it is stored in memory element 615-2, and if a message of high priority is received, it is stored in memory element 615-1.

The priority level is used by the OAMS module to process the received messages and to determine their mode of transfer to the GAMS module.

The IP addresses used by the IP module to transform a message into IP packets are predetermined addresses. Advantageously, one IP address exists per priority level. Similarly, one DSCP value exists per priority level. This relationship between the priority level of a message and the destination IP address on the ground makes it possible to have a simple correlation between a decision made at the application level, or in other words a choice of priority level, and the packet routing decisions managed by the network equipment items at a lower level, or in other words at the IP level.

Similarly, and to complete the preceding mechanism, the DSCP field of the IP packets is completed by a predefined value based on the priority of the message in order to permit better handling of packets by the network infrastructures. For example, an IP packet having a high DSCP field will have to be treated with priority by the routers through which it passes. It should be recalled here that a DSCP value corresponds to a field that is located in an IP packet and that allows attributing different levels of service to the network traffic.

The type of transmission between the airplane and the ground is managed by the communication controller, which determines the connection paths to each of the three possible IP addresses of the GAMS according to the availability of the different communication channels and in conformity with the policy of the airline company. The following table, accessible by the communication controller, illustrates one possible example of the policy of an airline company.

| Priority | DSCP | IP address | Preferred channel | Alternative channel 1 | Alternative channel 2 |
|---|---|---|---|---|---|
| high | 48 | IP1 | WiFi | GSM | Satellite |
| medium | 32 | IP2 | WiFi | WiMax | GSM |
| low | 16 | IP3 | WiFi | — | — |

In this example, the airline company gives preference to the communication means that are the least expensive while exhibiting good performances, but with limited coverage zones. If a connection of WiFi type cannot be established, a connection of mobile telephony type is authorized for the high and medium priorities, provided it is accessible. If these means are not available, a satellite connection offering an extended coverage zone but incurring high utilization costs and very poor performances is authorized solely for the high priorities. When the types of communication channels are not authorized for certain priority levels, the corresponding messages must wait until an authorized communication channel becomes available before they can be sent.

The messages in this case are messages having any format whatsoever, with which there are associated a priority level, a source address and a destination address. When a message to be transmitted and the associated information items are broken down into IP packets, the associated information items are no longer directly accessible, and they become so only after reconstruction of the message, which takes place according to a standard mechanism, corresponding to the mechanism for breakdown into IP packets. Alternatively, the messages may themselves comprise the complementary information items, such as the priority level and the source and destination addresses.

Figure 7:
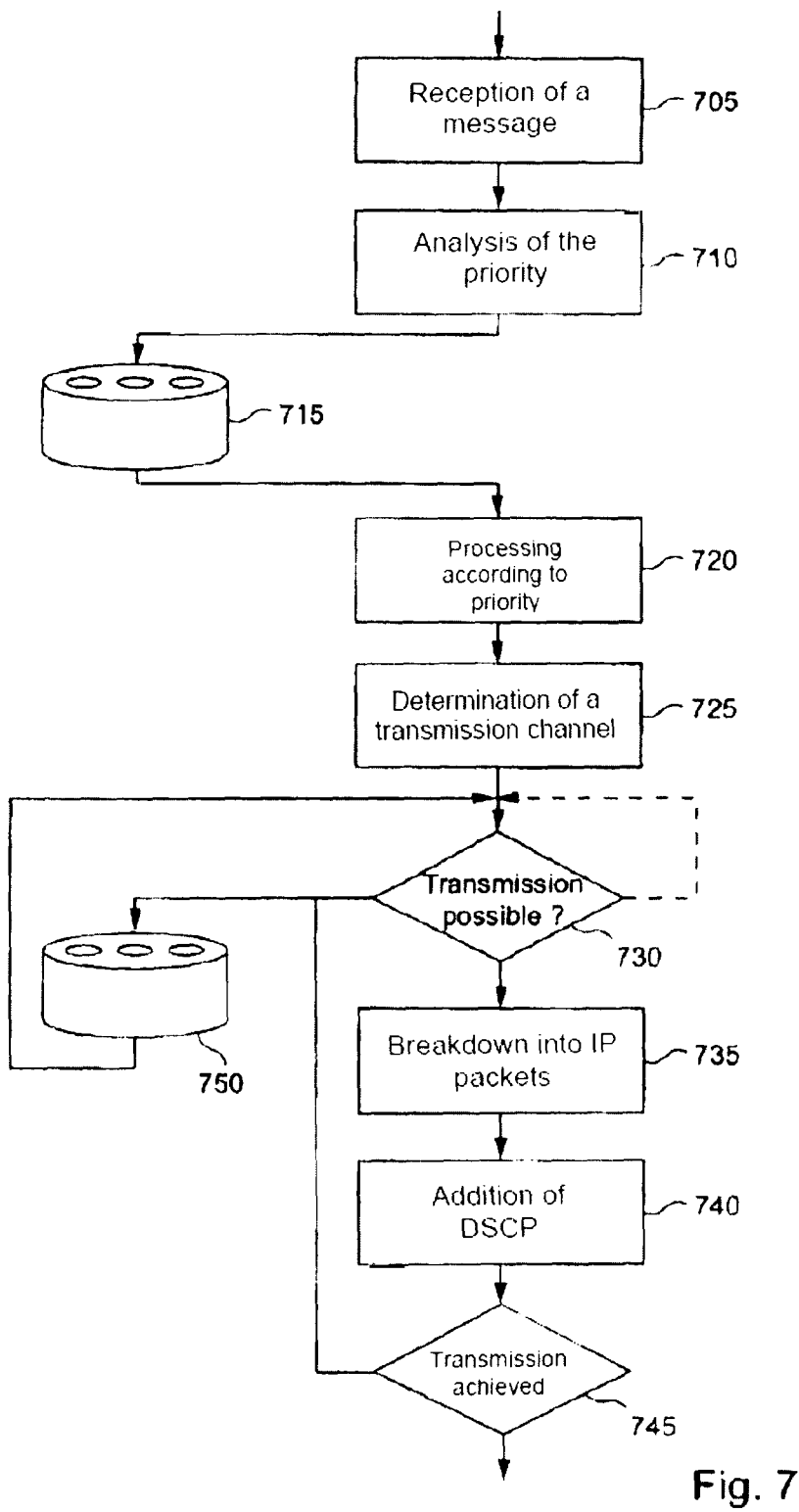
FIG. 7 shows an example of an algorithm for processing messages received from an application of the information system of an airplane by an OAMS module and that have to be transmitted to a GAMS module of an information system on the ground; and, FIG. 8 illustrates a second embodiment for the exchange of messages between the information system of an airplane and an information system on the ground.

FIG. 7 shows an example of an algorithm for processing messages received from an application of the information system of an airplane by the OAMS module and that must be transmitted to the GAMS module of a ground information system. When a message is received (step 705), the priority of this message is determined (step 710). The message is then stored in a memory 715 of FIFO type, according to its priority level. The messages stored in memory 715 are processed according to their priority level (step 720). The OAMS module then looks up the avionic database to determine if a communication channel is available (step 725). If a communication channel is available, a test is performed to determine if the transmission channel can be used (730). If the transmission channel can be used, the messages are broken down into IP packets, in which the IP address is a function of the priority level (step 735), and a DSCP value is added in each IP packet (step 740). The messages are then transmitted in the form of IP packets, and a test is performed to determine if the messages have been transmitted (step 745). If the designated communication channel cannot be used, the system determines if another communication channel can be used, as indicated by the dashed arrow. If no communication channel can be used to transmit the messages, these messages are stored temporarily in a memory 750, preferably according to their priority, to be sent later when the designated communication channel becomes available. Memory 750 in this case is similar to memory 715. In the same way, if the transmission of all messages or of certain messages has not been achieved correctly, these messages are stored temporarily in memory 750, preferably according to their priority, to be sent later when the designated communication channel becomes available. The "lifetime" of messages in memory 750 is preferably limited. For example, a message stored in memory 750 is automatically erased after a period of thirty minutes. The "lifetime" of the messages may be associated with the priority level of the message or with its nature. Certain messages may also be erased from memory 750 upon request of the application from which the message originated, for example if a pilot wishes to cancel the sending of a report that has become obsolete since it was issued.

In this way, memory 750 makes it possible to store messages that have to be transmitted via a communication channel that is not accessible, and also to manage a mechanism for resumption following an error, so that the transfer of a message between the OAMS and GAMS modules can be resumed, after a temporary break of the communication channel being used, at the exact point at which the transfer was interrupted. After a loss of connectivity, the OAMS module signals to the GAMS module that it is resuming the transfer of a message.

The OAMS module may comprise monitoring functionalities and the GAMS module may comprise monitoring and statistics functionalities. Monitoring allows an application to query its communication server about the state of sending of its messages, for example 20% of the first message and 50% of the second, and about the time and date of the last connection. The information may be obtained via requests for the application. The statistics functionalities of the GAMS module permit the information system administrator of the airline company to have a general state of the system, such as the number of messages sent successfully, the number of failures or the volume exchanged.

Although the description of the transmission of a message has been described as originating from an OAMS module, the transmission of a message from a GAMS module is similar.

It should be noted that the transmissions of messages may be of unicast type (from one system to another) or of multicast type (from one system to several others), or in other words from one application of the information system of one airplane to one application of the ground information system and vice versa or from one application of the information system of one airplane to several applications of the ground information system or from one application of the ground information system to several applications of the information system of one airplane or of several airplanes.

For security reasons, it is preferable to prohibit sending of messages from the ground to the ground or from an airplane to an airplane.

According to a second embodiment of the invention, the interfaces between the applications and the two servers of the OAMS and GAMS modules are different. They are not developed upon proprietary APIs but are constructed as "Web services". The advantage of such an implementation is that the two servers communicating within the airplane information system and/or the ground information system can be integrated directly by virtue of a complete SOA solution (Service Oriented Architecture).

The modification consists mainly in having that the SOAP protocol (Simple Object Access Protocol) supported natively by the OAMS and GAMS interfaces and the specification of these same interfaces distributed within the SOA infrastructure according to the WSDL format (Web Service Description Language).

Figure 8:
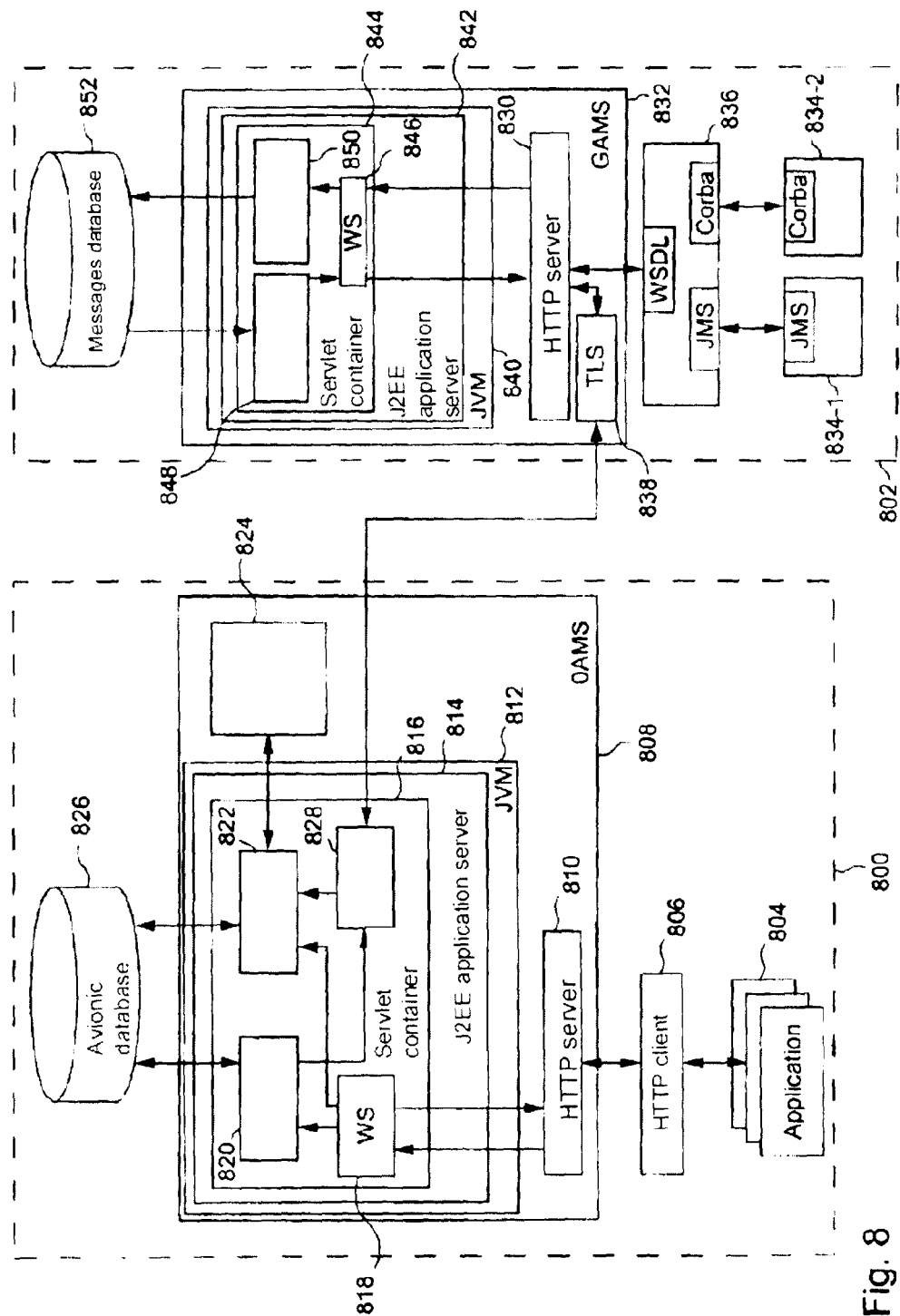

In this second embodiment, therefore, the SSL (Secure Socket Layer)/TLS part of the GAMS module is replaced by an equipment item that natively manages this type of session, as illustrated in FIG. 8. Such modifications are motivated by the fact that in this way the system can become interoperable with the commercially available EAI solutions (Enterprise Application Integration) and that the performances of the system are appreciably improved thereby.

FIG. 8 illustrates the second embodiment for the exchange of messages between airplane information system 800 and ground information system 802. Applications 804 of airplane information system 800 use an http client 806 to transmit requests to OAMS module 808 and more precisely to a front-end http server 810 of OAMS module 808. The results of the requests are transmitted to applications 804 by http server 810 via http client 806.

The requests for applications 804 received by http server 810 are transmitted to the application server, in this case J2EE application server 814 of Java virtual machine 812 (JVM). The results of the requests are transmitted to http server 810 by application server 814.

Advantageously, application server 814 comprises a Java servlet container 816 for processing the requests for applications by virtue of a web service 818 (WS) and of two dedicated services 820 and 822, of the "send" and "fetch" type respectively. The "send" service assures transmission of messages to the GAMS module, while the "fetch" service is in charge of recovering the messages waiting on the same server in memory 824.

To assure these tasks, these two services are interfaced with avionic database 826 in order to verify the availability of communication channels, with http server 810 in order to communicate with the applications, and with the implementation of an https client 828 to communicate securely with the ground information system. It should be noted that the OAMS module additionally comprises an interface with a file manager of the server for storage, in memory 824, of messages waiting to be sent to the ground information system or to be recovered by applications 804. Within memory 824, the messages are preferably organized into dedicated message boxes for each application.

Similarly, a front-end http server 830 of GAMS module 832 receives requests for applications 834-1 and 834-2 (the number of applications is not limited) from ground information system 802 via EAI interface 836. EAI interface 836 in this case comprises JMS (Java Message Service) and Corba interfaces capable of exchanging data with the JMS and Corba clients of applications 834-1 and 834-2. Front-end http server 830 of GAMS module 832 also receives the requests for applications 804 from OAMS modules 808 of airplane information systems 800 via an externalized TLS module 838. The responses to the requests for applications are transmitted by http server 830 to application servers 834-1 and 834-2 via EAI interface 836 and to applications 804 via externalized TLS module 838.

The requests for applications are transmitted by http server 830 to the services of servlet container 844 of J2EE application server 842 of Java virtual machine 840. The results of the requests are transmitted to http server 830 by application server 842.

Just as the OAMS module, the GAMS module advantageously comprises a web service 846 (WS) and two dedicated services 848 and 850, known as "message provider" and "receive" respectively. "Message provider" service 848 makes the messages available to the OAMS modules in question, while "receive" service 850 receives the messages from http server 830 and distributes them in the message boxes of a memory or of a database 852. Thus the two services 848 and 850 are interfaced with database 852 in order to store the messages in dedicated message boxes, which are preferably organized in the same way as in the OAMS modules, or in other words dedicated to each application, with the sole exception that the GAMS module must manage several airplanes and therefore must group the message boxes for each aircraft and for each priority.

The use of interfaces of the web service type makes it possible not to use proprietary APIs necessary for the applications to communicate with the communication system. Nevertheless, it is possible to retain a dedicated connector for the interface with the EAI.

Web services 818 and 846 added into the servlet containers of the OAMS module and of the GAMS module have the function of recovering the SOAP requests emitted by the client applications via an interface described in WSDL and of transmitting them to the other services.

Naturally, to satisfy specific needs, a person competent in the field of the invention will be able to apply modifications in the foregoing description.

The invention claimed is:

1. A method for communication of data in an aircraft for exchanging data between at least one application of the aircraft and at least one application on the ground, the aircraft including a mechanism capable of establishing at least one connection path between the aircraft and at least one entity on the ground according to a plurality of communication channels, said plurality of communication channels including one communication channel of an open type and one communication channel of a different type, the method comprising:

controlling said communication channels before processing a data element for transmission between said applications, the controlling including
  detecting an event relating to availability of a communication channel of said plurality of communication channels,
  identifying a modification of a communication parameter, said communication parameter relating to said availability of said communication channel of said plurality of communication channels,
  determining a communication configuration that identifies said communication channel of the plurality of communication channels according to the event and said communication parameter to permit the aircraft to receive or transmit the data element to the at least one entity on the ground by said communication channel,
  transmitting said communication configuration to at least one equipment of a communication network of the aircraft, thereby enabling said equipment to modify its configuration accordingly,
  transmitting information relating to said availability of the communication channel to a database,
  checking said database, and
  upon processing of said information relating to said availability of the communication channel, adapting the mechanism capable of establishing at least one connection path to establish at least one connection path between the aircraft and the at least one entity on the ground according to the communication configuration; and
the method further including controlling the transfer of said data element between said applications independently from said controlling of said communication channels; and
after processing the data element, transmitting at least one datum in the data, the transmitting includes
  determining a priority level of the at least one datum,
  checking the database to determine if the selected communication channel of the at least one connection path is compatible with the determined priority level, and
  when the type of the determined communication channel is incompatible with the priority level, delaying transmission of the at least one datum until a compatible communication channel becomes available, and canceling transmission of the at least one datum when a duration of a delay exceeds a duration of a lifetime of the at least one datum, the duration of the lifetime of the at least one datum being determined based on the priority level of the at least one datum.

2. A method according to claim 1, further comprises transmitting the at least one datum in the data to the at least one entity on the ground if the type of the determined communication channel is compatible with the priority level.

3. A method according to claim 2, wherein a destination address of the at least one entity on the ground is associated with each priority level, and the at least one datum is transmitted to the destination address associated with the priority level of the at least one datum.

4. A method according to claim 2, wherein the determination of the compatibility of the determined communication channel with the priority level is a function of at least one configuration parameter.

5. A method according to claim 1, further comprising accessing at least one datum to be transmitted, the format of the at least one accessed datum being independent of the communication channel of the at least one connection path.

6. A non-transitory computer readable medium comprising computer executable instructions for executing the method according to claim 1.

7. A device for communication of data in an aircraft for exchanging data between at least one application of the aircraft and at least one application on the ground, the aircraft including a mechanism capable of establishing at least one connection path between the aircraft and at least one entity on the ground according to a plurality of communication channels, said plurality of communication channels including one communication channel of an open type and one communication channel of a different type, the device comprising:

means for controlling said communication channels before processing a data element for transmission between said applications, the means for controlling including
  means for detecting an event relating to availability of a communication channel of said plurality of communication channels,
  means for identifying a modification of a communication parameter, said communication parameter relating to said availability of said communication channel of said plurality of communication channels,
  means for determining a communication configuration that identifies said communication channel of the plurality of communication channels according to the event and said communication parameter to permit the aircraft to receive or transmit the data element to the at least one entity on the ground by said communication channel,
  means for transmitting said communication configuration to at least one equipment of a communication network of the aircraft, thereby enabling said equipment to modify its configuration accordingly,
  means for transmitting information relating to said availability of the communication channel to a database,
  means for checking said database, and
  means for adapting the mechanism capable of establishing at least one connection path to establish at least one connection path between the aircraft and the at least one entity on the ground according to the communication configuration upon processing of said information relating to said availability of the communication channel; and the device further including means for controlling the transfer of said data element between said applications independently from said controlling of said communication channels; and means for transmitting at least one datum in the data element by determining a priority level of the at least one datum, means for checking the database to determine if the selected communication channel of the at least one connection path is compatible with the determined priority level, and when the type of the determined communication channel is incompatible with the priority level, delaying transmission of the at least one datum until a compatible communication channel becomes available, and canceling transmission of the at least one datum when a duration of a delay exceeds a duration of a lifetime of the at least one datum, the duration of the lifetime of the at least one datum being determined based on the priority level of the at least one datum.

8. A device according to claim 7, wherein the means for transmitting the at least one datum in the data transmits the at least one datum to the at least one entity on the ground if the determined type is compatible with the priority level.

9. A device according to claim 8, further comprising means for storing the data to be transmitted in memory, the data to be transmitted being stored in memory according to priority levels associated with the data to be transmitted, a destination address of the at least one entity on the ground being associated with each priority level.

10. A device according to claim 7, wherein the means for detecting an event is capable of detecting a modification of the state of the communication channels or of the position of the aircraft, and the state of the communication channel includes an availability of the communication channel.

11. The method according to claim 1, wherein said step of controlling said communication channels is independent from said step of controlling the transfer of said data between said applications.

12. The device according to claim 7, wherein said means for controlling said communication channel operates independently from said means for controlling the transfer of said data between said applications.

* * * * *